(12) United States Patent
Maruyama et al.

(10) Patent No.: US 7,978,792 B2
(45) Date of Patent: Jul. 12, 2011

(54) REPRODUCING APPARATUS AND METHOD, SIGNAL PROCESSING APPARATUS AND METHOD, AND PROGRAM

(75) Inventors: Tsutomu Maruyama, Chiba (JP); Junya Shiraishi, Nagano (JP)

(73) Assignee: Sony Corporation, Tokyo (JP)

( * ) Notice: Subject to any disclaimer, the term of this patent is extended or adjusted under 35 U.S.C. 154(b) by 846 days.

(21) Appl. No.: 11/944,543

(22) Filed: Nov. 23, 2007

(65) Prior Publication Data

US 2008/0151987 A1    Jun. 26, 2008

(30) Foreign Application Priority Data

Dec. 22, 2006  (JP) .................................. 2006-345765

(51) Int. Cl.
  *H04L 27/06* (2006.01)
(52) U.S. Cl. .......................................... 375/341; 360/65
(58) Field of Classification Search .................. 375/341, 375/353, 350; 341/61; 360/39; 369/59.22
See application file for complete search history.

(56) References Cited

U.S. PATENT DOCUMENTS

| | | | |
|---|---|---|---|
| 6,674,707 B2* | 1/2004 | Ogura et al. | 369/59.22 |
| 7,257,181 B2* | 8/2007 | Jones et al. | 375/350 |
| 7,428,282 B2* | 9/2008 | Sommer | 375/353 |
| 7,564,931 B2* | 7/2009 | Venkataramani et al. | 375/341 |
| 2005/0219727 A1* | 10/2005 | Kajiwara et al. | 360/39 |
| 2007/0194955 A1* | 8/2007 | Azizi | 341/61 |

FOREIGN PATENT DOCUMENTS

JP    2003-317405    11/2003

OTHER PUBLICATIONS

Zero_Phase_Filters; pp. 1-3; Sep. 23, 2010.*

* cited by examiner

Primary Examiner — David C. Payne
Assistant Examiner — Leon-Viet Q Nguyen
(74) Attorney, Agent, or Firm — Oblon, Spivak, McClelland, Maier & Neustadt, L.L.P.

(57) ABSTRACT

A reproducing apparatus for reproducing channel data from a recording medium using the ITR includes a reading unit reading an information signal recorded on the recording medium; a phase interpolator interpolating a phase of the information signal read on the basis of a phase error signal sent as a feedback; a first waveform equalizer equalizing a waveform of the phase-interpolated information signal while keeping the phase of the information signal fixed; a phase-error-signal generator generating the phase error signal to be sent as a feedback to the phase interpolator on the basis of the information signal whose waveform has been equalized by the first waveform equalizer; a second waveform equalizer equalizing the waveform of the phase-interpolated information signal without limiting a phase change; and a decoder generating the channel data by decoding the information signal whose waveform has been equalized by the second waveform equalizer.

7 Claims, 8 Drawing Sheets

FIG. 1

Related Art

Related Art

REPRODUCING APPARATUS AND METHOD, SIGNAL PROCESSING APPARATUS AND METHOD, AND PROGRAM

CROSS REFERENCES TO RELATED APPLICATIONS

The present invention contains subject matter related to Japanese Patent Application JP 2006-345765 filed in the Japanese Patent Office on Dec. 22, 2006, the entire contents of which are incorporated herein by reference.

BACKGROUND OF THE INVENTION

1. Field of the Invention

The present invention relates to reproducing apparatuses and methods, signal processing apparatuses and methods, and programs, and more particularly, to a reproducing apparatus and method, a signal processing apparatus and method, and a program suitable for use in reproducing channel data from a recording medium with high recording density using interpolated timing recovery (ITR).

2. Description of the Related Art

As the recording densities of recording media have increased in recent years, techniques for accurately reproducing channel signals from such higher density recording media have become necessary.

Figure 1:
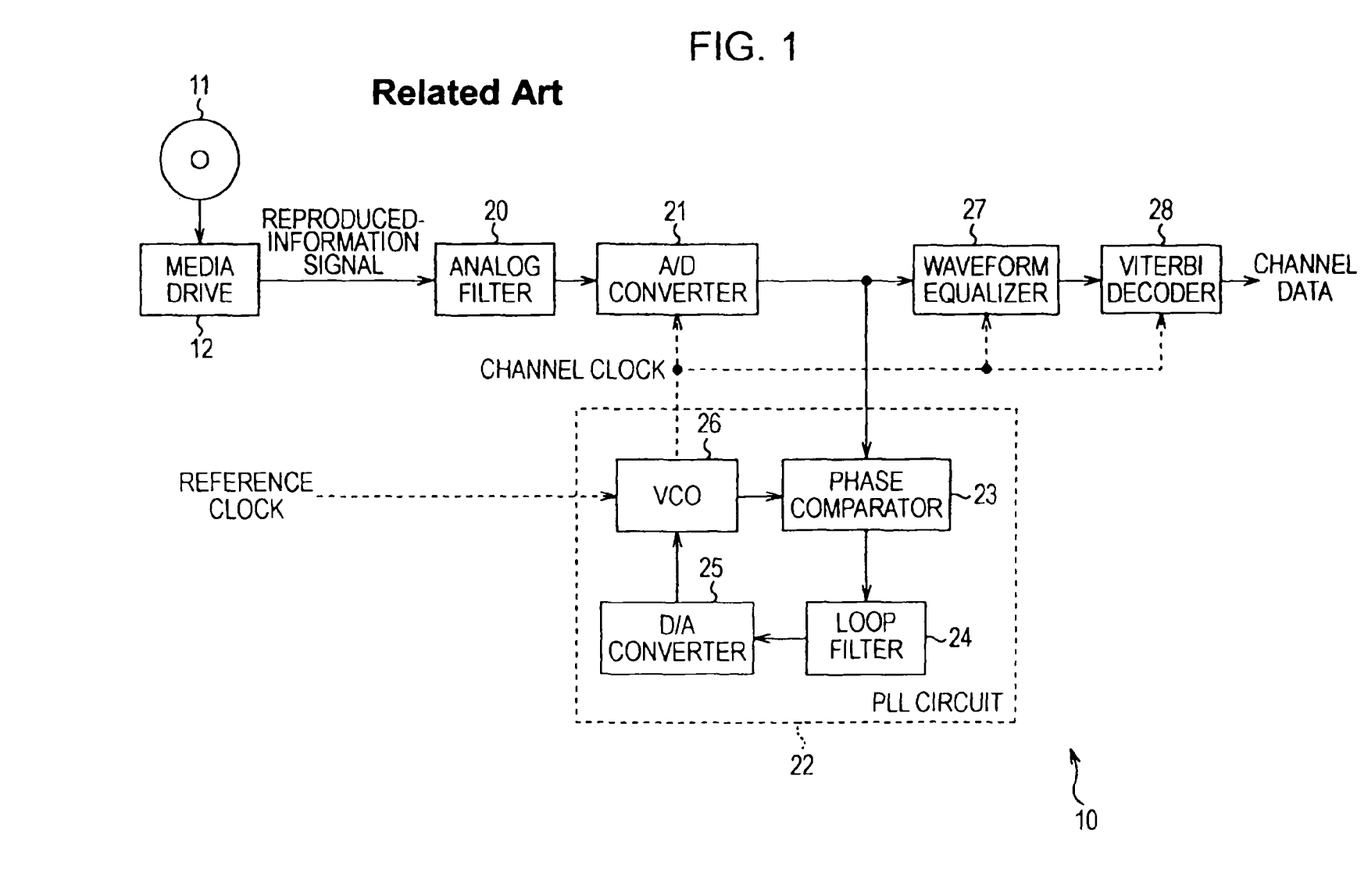
FIG. 1 is a block diagram of an exemplary structure of a reproducing apparatus of the related art.

FIG. 1 illustrates an exemplary structure of a general reproducing apparatus of the related art for reproducing signals recorded on recording media, such as optical disks and magnetic disks.

Components of a reproducing apparatus 10 shown in FIG. 1 operate in synchronization with a channel clock generated by adjusting a reference clock on the basis of a reproduced-information signal read from a recording medium 11.

That is, in the reproducing apparatus 10, a reproduced-information signal (radio-frequency (RF) signal) read from the recording medium 11 by a disk drive 12 is waveform-equalized by an analog filter 20. The waveform-equalized signal is digitized (binarized) by an analog-to-digital (A/D) converter 21, and the binarized (digitized) signal is supplied to a phase-locked loop (PLL) circuit 22 and a waveform equalizer 27.

In the PLL circuit 22, a phase comparator 23 detects a phase difference between the binarized reproduced-information signal and an output signal of a voltage-controlled oscillator (VCO) 26, and a loop filter 24 generates a phase error signal corresponding to the phase difference detected. The phase error signal is converted by a digital-to-analog (D/A) converter 25 into an analog signal, which is then supplied to the VCO 26. The VCO 26 generates a channel clock which corresponds to the analog phase error signal and which is based on the reference clock and supplies the channel clock to a subsequent stage. In this manner, the channel clock in synchronization with the reproduced-information signal is generated.

The waveform equalizer 27 equalizes the waveform of the digitized reproduced-information signal, and the waveform-equalized signal is decoded by a Viterbi decoder 28. As a result, the decoded signal serving as channel data is generated.

The reproducing apparatus 10 is based on a structure combining waveform equalization to partial response and maximum likelihood detection (Viterbi detection). This structure is referred to as partial response maximum likelihood (PRML).

As is clear from the foregoing description, it is necessary for PRML represented by the reproducing apparatus 10 to use a channel clock generated by a PLL circuit in synchronization with a reproduced-information signal.

The reproducing apparatus 10 shown in FIG. 1 can reproduce channel data from the recording medium 11, such as a general optical disk of the related art. However, when reproducing channel data from a higher density recording medium, marks recorded on the recording medium are closer together and interfere with each other. Deterioration of the quality of a binary signal becomes a direct cause of difficulty for the PLL circuit 22 to correctly generate a channel clock in synchronization with a reproduced-information signal. As a result, it becomes difficult to reproduce channel data.

Assuming that marks recorded on a higher density recording medium interfere with each other, there is a demand for a structure that can perform timing recovery of a channel clock with higher accuracy than a PLL circuit of the related art.

Figure 2:
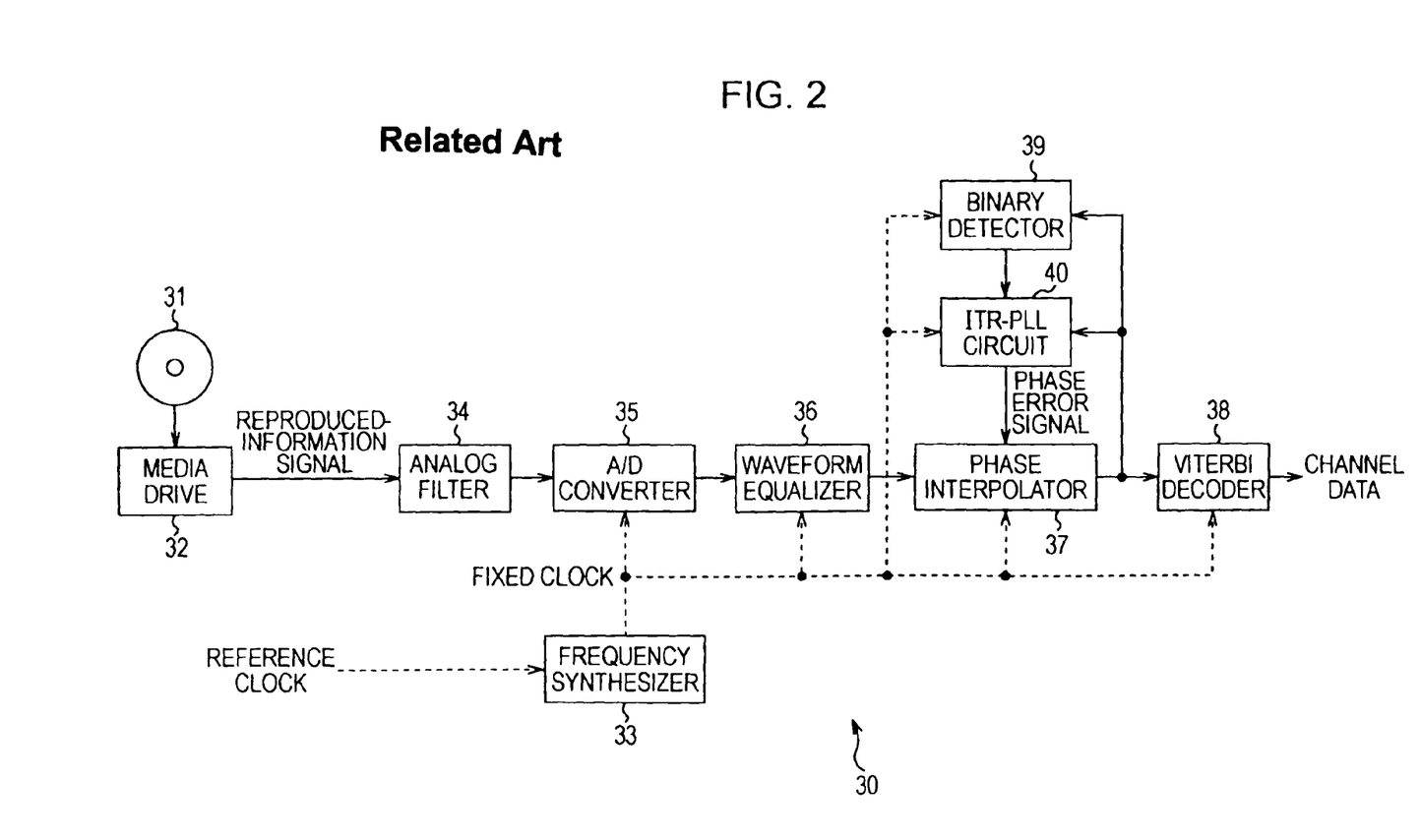
FIG. 2 is a block diagram of an exemplary structure of a reproducing apparatus of the related art.

FIG. 2 illustrates an exemplary structure of a reproducing apparatus for satisfying the foregoing necessity. A reproducing apparatus 30 shown in FIG. 2 is based on ITR. ITR is the technique of sampling a reproduced-information signal read from a recording medium 31 in synchronization with a fixed clock and performing timing recovery by use of phase interpolation. ITR is described in, for example, Japanese Unexamined Patent Application Publication No. 2003-317405.

In the reproducing apparatus 30, a predetermined fixed clock is generated by a frequency synthesizer 33 on the basis of a reference clock and is supplied to components of the reproducing apparatus 30. A reproduced-information signal (RF signal) read from the recording medium 31 by a media drive 32 is waveform-equalized by an analog filter 34. The waveform-equalized signal is sampled (digitized) by an A/D converter 35 in synchronization with the fixed clock, and the sampled (digitized) signal is supplied to a waveform equalizer 36. The waveform equalizer 36 equalizes the waveform of the digitized reproduced-information signal and supplies the waveform-equalized signal to a phase interpolator 37.

The phase interpolator 37 interpolates the phase of the digitized reproduced-information signal on the basis of a phase error signal sent as a feedback from an ITR-PLL circuit 40 and outputs the phase-interpolated signal to a Viterbi detector 38, a binary detector 39, and the ITR-PLL circuit 40.

The Viterbi detector 38 decodes the phase-interpolated signal and generates the decoded result serving as channel data.

The binary detector 39 binarizes the phase-interpolated signal, and the binary signal generated is supplied to the ITR-PLL circuit 40. The ITR-PLL circuit 40 generates a phase error signal corresponding to a phase difference between the phase-interpolated signal and the binary signal and outputs the phase error signal to the phase interpolator 37.

The reproducing apparatus 30 can reproduce channel data from the higher density recording medium 31. In the reproducing apparatus 30, however, since the waveform equalizer 36 is provided before the phase interpolator 37, the waveform-equalized signal is out of phase with the channel data generated as a result of Viterbi decoding. It is therefore difficult to adaptively change tap coefficients of a finite impulse response (FIR) filter constituting the waveform equalizer 36 using a simple method, such as the least mean square (LMS) algorithm or the like.

SUMMARY OF THE INVENTION

A reproducing apparatus that can reproduce channel data from a higher density recording medium and adaptively change tap coefficients of an FIR filter in a waveform equalizer using a simple method, such as the LMS algorithm or the like, is conceived.

Figure 3:
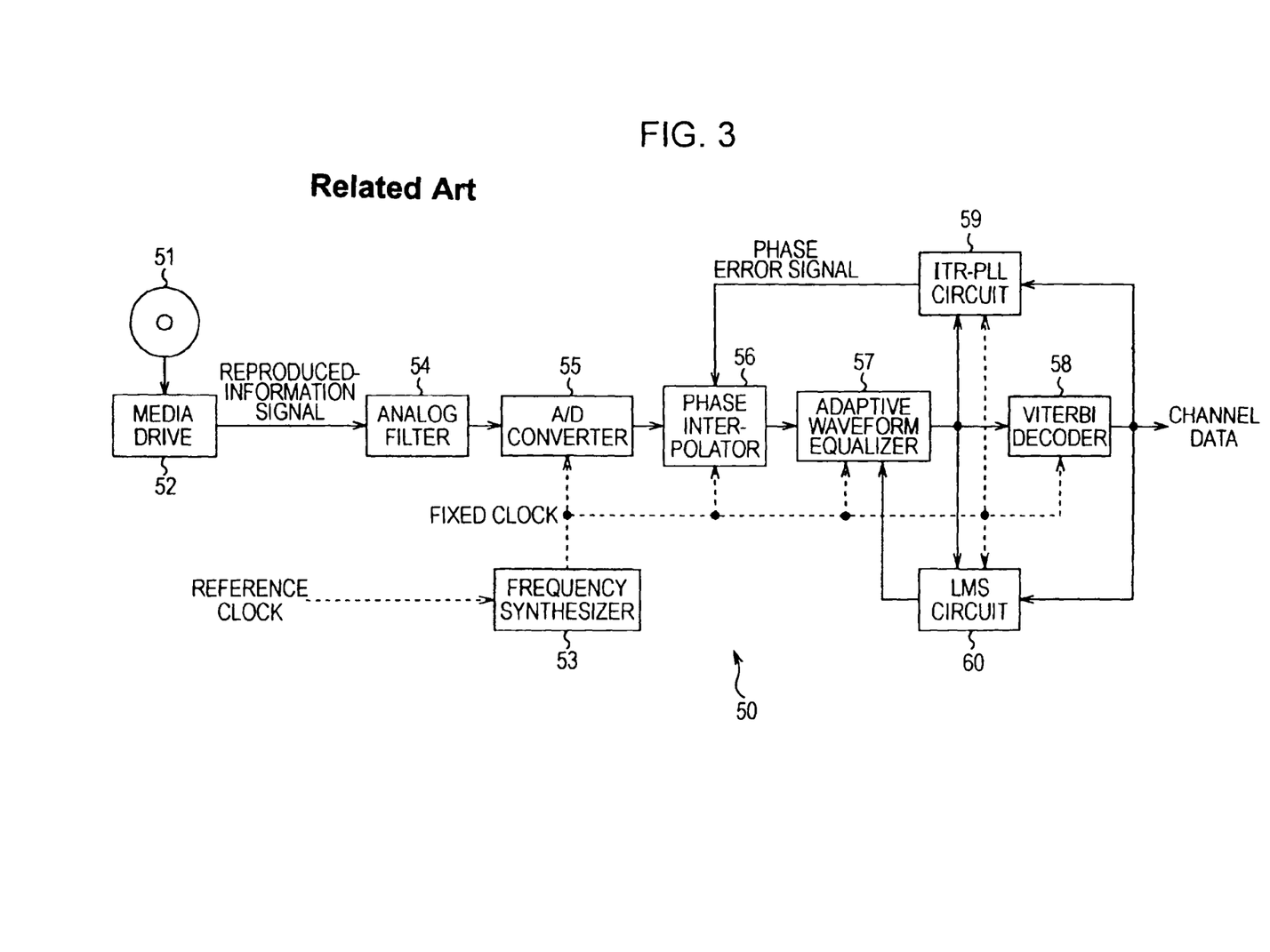
FIG. 3 is a block diagram of an exemplary structure of a reproducing apparatus of the related art.

FIG. 3 illustrates an exemplary structure of the reproducing apparatus. In a reproducing apparatus 50 shown in FIG. 3, a predetermined fixed clock is generated by a frequency synthesizer 53 on the basis of a reference clock and is supplied to components of the reproducing apparatus 50. A reproduced-information signal (RF signal) read from a recording medium 51 by a media drive 52 is waveform-equalized by an analog filter 54. The waveform-equalized signal is sampled (digitized) by an A/D converter 55 in synchronization with the fixed clock, and the sampled (digitized) signal is supplied to a phase interpolator 56.

The phase interpolator 56 interpolates the phase of the digitized reproduced-information signal on the basis of a phase error signal sent as a feedback from an ITR-PLL circuit 59 and outputs the phase-interpolated signal to an adaptive phase equalizer 57.

On the basis of feedback information input from an LMS circuit 60, the adaptive phase equalizer 57 adaptively changes tap coefficients of an FIR filter, equalizes the waveform of the phase-interpolated signal, and outputs the waveform-equalized signal to a Viterbi decoder 58, the ITR-PLL circuit 59, and the LMS circuit 60 at a subsequent stage.

The Viterbi detector 58 decodes the waveform-equalized signal and generates the decoded result serving as channel data. The channel data generated is output to a subsequent stage and sent as a feedback to the ITR-PLL circuit 59 and the LMS circuit 60.

The ITR-PLL circuit 59 generates a phase error signal corresponding to a phase difference between the waveform-equalized signal and the channel data generated as a result of Viterbi decoding and outputs the phase error signal to the phase interpolator 56. By applying the LMS algorithm on the waveform-equalized signal and the channel data generated as a result of Viterbi decoding, the LMS circuit 60 generates feedback information for changing the tap coefficients in the adaptive phase equalizer 57.

According to the reproducing apparatus 50, since the adaptive phase equalizer 57 and the Viterbi decoder 58 are placed on a path for sending a phase error signal as a feedback to the phase interpolator 56, the waveform-equalized signal is in phase with the channel data generated as a result of Viterbi decoding. Therefore, the LMS circuit 60 can generate feedback information for adaptively changing the tap coefficients of the FIR filter in the adaptive phase equalizer 57 by applying the LMS algorithm on the channel data.

However, according to the reproducing apparatus 50, the feedback information supplied from the LMS circuit 60 to the adaptive phase equalizer 57 interferes with the phase error signal sent as a feedback from the ITR-PLL circuit 59 to the phase interpolator 56, and, as a result, the phase interpolation processing performed by the phase interpolator 56 may become unstable, and the tap coefficients of the FIR filter in the adaptive phase equalizer 57 may not converge but diverge instead. As a result, the waveform equalization processing may not be performed appropriately, and the decoding performance of Viterbi decoding may be degraded.

It is desirable to perform phase interpolation processing based on a phase error signal sent as a feedback and to suppress degradation of the performance of Viterbi decoding in the case where channel data is reproduced from a higher density recording medium.

According to a first embodiment of the present invention, there is provided a reproducing apparatus for reproducing channel data from a recording medium using the ITR. The reproducing apparatus includes the following elements: reading means for reading an information signal recorded on the recording medium; phase interpolating means for interpolating a phase of the information signal read by the reading means on the basis of a phase error signal sent as a feedback; first waveform equalizing means for equalizing a waveform of the information signal whose phase has been interpolated by the phase interpolating means while keeping the phase of the information signal fixed; phase-error-signal generating means for generating the phase error signal to be sent as a feedback to the phase interpolating means on the basis of the information signal whose waveform has been equalized by the first waveform equalizing means; second waveform equalizing means for equalizing the waveform of the information signal whose phase has been interpolated by the phase interpolating means without limiting a change of the phase; and decoding means for generating the channel data by decoding the information signal whose waveform has been equalized by the second waveform equalizing means.

The phase-error-signal generating means may generate the phase error signal to be sent as a feedback to the phase interpolating means on the basis of a phase error between the information signal whose waveform has been equalized by the first waveform equalizing means and the channel data generated by the decoding means.

The first waveform equalizing means may include an FIR filter including a plurality of taps, and tap coefficients of the plurality of taps are symmetrical about a central one of the plurality of taps.

The second waveform equalizing means may include an FIR filter including a plurality of taps, and tap coefficients of the plurality of taps are determined on the basis of an LMS algorithm.

According to the first embodiment of the present invention, there is provided a reproducing method for a reproducing apparatus for reproducing channel data from a recording medium using the ITR. The reproducing method includes the steps of reading an information signal recorded on the recording medium; interpolating a phase of the information signal read on the basis of a phase error signal sent as a feedback; equalizing a waveform of the phase-interpolated information signal while keeping the phase of the information signal fixed; generating the phase error signal to be sent as a feedback for the phase interpolation on the basis of the information signal whose waveform has been equalized while keeping the phase fixed; equalizing the waveform of the phase-interpolated information signal without limiting a change of the phase; and generating the channel data by decoding the information signal whose waveform has been equalized without limiting a change of the phase.

According to the first embodiment of the present invention, there is provided a control program for a reproducing apparatus for reproducing channel data from a recording medium using the ITR, the program allowing a computer included in the reproducing apparatus to perform a process including the steps of reading an information signal recorded on the recording medium; interpolating a phase of the information signal read on the basis of a phase error signal sent as a feedback; equalizing a waveform of the phase-interpolated information signal while keeping the phase of the information signal fixed; generating the phase error signal to be sent as a feedback for the phase interpolation on the basis of the information signal whose waveform has been equalized while keeping the phase fixed; equalizing the waveform of the phase-interpolated information signal without limiting a change of the phase; and generating the channel data by decoding the information signal whose waveform has been equalized without limiting a change of the phase.

According to the first embodiment of the present invention, the phase of an information signal read from a recording medium is interpolated on the basis of a phase error signal sent as a feedback. The waveform of the phase-interpolated information signal is equalized while keeping the phase fixed, and, on the basis of this waveform-equalized information signal, the phase error signal to be sent as a feedback is generated. The waveform of the phase-interpolated information signal is equalized without limiting a change of the phase, and this waveform-equalized information signal is decoded, thereby generating channel data.

According to a second embodiment of the present invention, there is provided a signal processing apparatus for processing an information signal read from a recording medium. The signal processing apparatus includes the following elements: phase interpolating means for interpolating a phase of the information signal read from the recording medium on the basis of a phase error signal sent as a feedback; waveform equalizing means for equalizing a waveform of the information signal whose phase has been interpolated by the phase interpolating means while keeping the phase of the information signal fixed; and phase-error-signal generating means for generating the phase error signal to be sent as a feedback to the phase interpolating means on the basis of the information signal whose waveform has been equalized by the waveform equalizing means.

The waveform equalizing means may include an FIR filter including a plurality of taps, and tap coefficients of the plurality of taps are symmetrical about a central one of the plurality of taps.

According to the second embodiment of the present invention, there is provided a signal processing method for a signal processing apparatus for processing an information signal read from a recording medium, including the steps of interpolating a phase of the information signal read from the recording medium on the basis of a phase error signal sent as a feedback; equalizing a waveform of the phase-interpolated information signal while keeping the phase of the information signal fixed; and generating the phase error signal to be sent as a feedback for the phase interpolation on the basis of the information signal whose waveform has been equalized.

According to the second embodiment of the present invention, there is provided a control program for a signal processing apparatus for processing an information signal read from a recording medium, the program allowing a computer included in the signal processing apparatus to perform a process including the steps of interpolating a phase of the information signal read from the recording medium on the basis of a phase error signal sent as a feedback; equalizing a waveform of the phase-interpolated information signal while keeping the phase of the information signal fixed; and generating the phase error signal to be sent as a feedback for the phase interpolation on the basis of the information signal whose waveform has been equalized.

According to the second embodiment of the present invention, the phase of an information signal read from a recording medium is interpolated on the basis of a phase error signal sent as a feedback. The waveform of the phase-interpolated information signal is equalized while keeping the phase fixed. On the basis of this waveform-equalized signal, the phase error signal to be sent as a feedback is generated.

According to the first embodiment of the present invention, when reproducing channel data from a higher density recording medium, phase interpolation can be performed in a stable manner on the basis of a phase error signal sent as a feedback, and degradation of the performance of Viterbi decoding can be suppressed.

According to the second embodiment of the present invention, when reproducing channel data from a higher density recording medium, phase interpolation can be performed in a stable manner on the basis of a phase error signal sent as a feedback.

DESCRIPTION OF THE PREFERRED EMBODIMENTS

Before describing an embodiment of the present invention, examples of correspondence between the features of the present invention and an embodiment described in the specification and/or shown in the drawings will be described below. This description is intended to assure that an embodiment supporting the present invention is described in this specification and/or shown in the drawings. Thus, even if a certain embodiment described in this specification and/or shown in the drawings is not described herein as relating to an embodiment corresponding to a feature of the present invention, that does not necessarily mean that the embodiment does not correspond to that feature. Conversely, even if an embodiment is described herein as corresponding to a feature, that does not necessarily mean that the embodiment does not correspond to other features.

A reproducing apparatus (e.g., a reproducing apparatus 70 shown in FIG. 4) according to a first embodiment of the present invention includes reading means (e.g., a media drive 72 shown in FIG. 4) for reading an information signal recorded on a recording medium; phase interpolating means (e.g., a phase interpolator 76 shown in FIG. 4) for interpolating a phase of the information signal read by the reading means on the basis of a phase error signal sent as a feedback; first waveform equalizing means (e.g., a phase-fixed adaptive waveform equalizer 80 shown in FIG. 4) for equalizing a waveform of the information signal whose phase has been interpolated by the phase interpolating means while keeping the phase of the information signal fixed; phase-error-signal generating means (e.g., an ITR-PLL circuit 81 shown in FIG. 4) for generating the phase error signal to be sent as a feedback to the phase interpolating means on the basis of the information signal whose waveform has been equalized by the first waveform equalizing means; second waveform equalizing means (e.g., an adaptive waveform equalizer 77 shown in FIG. 4) for equalizing the waveform of the information signal whose phase has been interpolated by the phase interpolating means without limiting a change of the phase;

and decoding means (e.g., a Viterbi decoder 78 shown in FIG. 4) for generating the channel data by decoding the information signal whose waveform has been equalized by the second waveform equalizing means.

Figure 8:
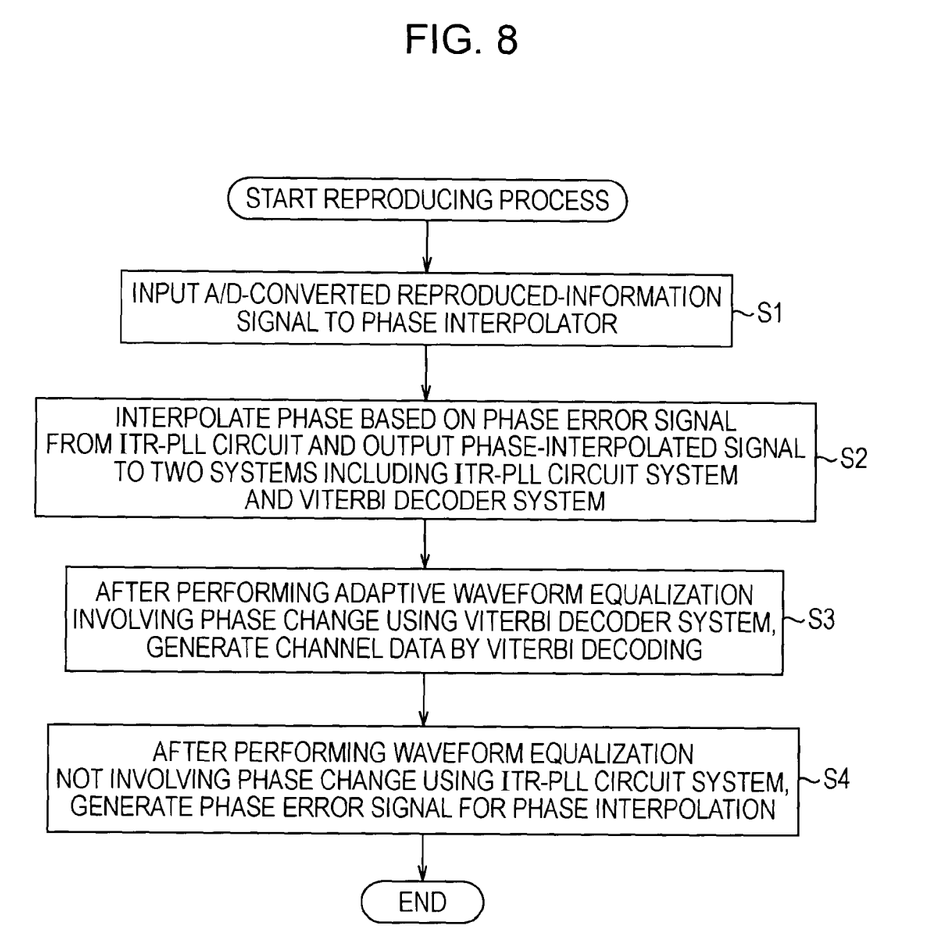
FIG. 8 is a flowchart of a reproducing process performed by the reproducing apparatus according to the embodiment of the present invention.

A reproducing method and program according to the first embodiment of the present invention includes the steps of reading an information signal recorded on the recording medium (e.g., step S1 shown in FIG. 8); interpolating a phase of the information signal read on the basis of a phase error signal sent as a feedback (e.g., step S2 shown in FIG. 8); equalizing a waveform of the phase-interpolated information signal while keeping the phase of the information signal fixed (e.g., step S4 shown in FIG. 8); generating the phase error signal to be sent as a feedback for the phase interpolation on the basis of the information signal whose waveform has been equalized while keeping the phase fixed (e.g., step S4 shown in FIG. 8); equalizing the waveform of the phase-interpolated information signal without limiting a change of the phase (e.g., step S3 shown in FIG. 8); and generating the channel data by decoding the information signal whose waveform has been equalized without limiting a change of the phase (e.g., step S3 shown in FIG. 8).

Figure 4:
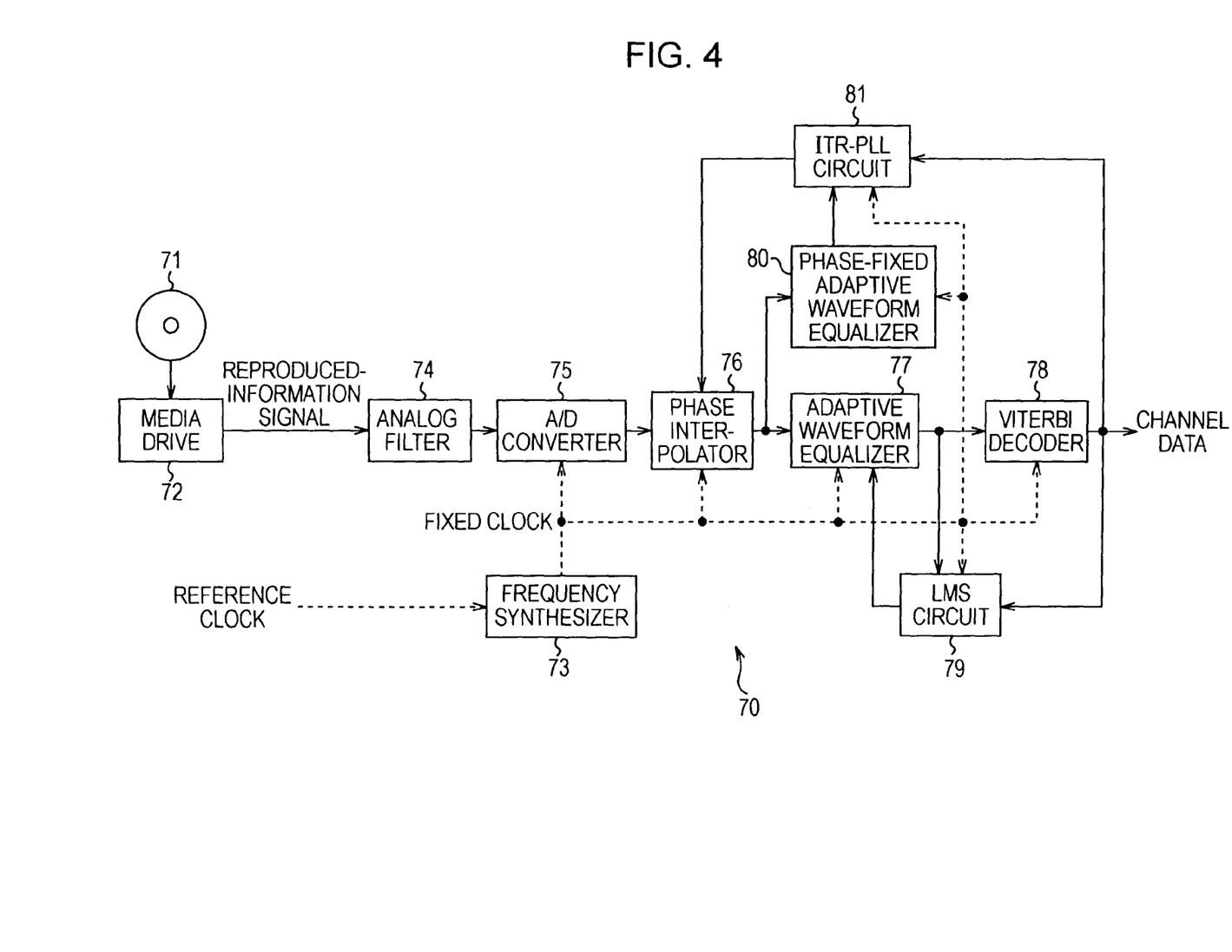
FIG. 4 is a block diagram of an exemplary structure of a reproducing apparatus according to an embodiment of the present invention.

A signal processing apparatus (e.g., the reproducing apparatus 70 shown in FIG. 4) according to a second embodiment of the present invention includes phase interpolating means (e.g., the phase interpolator 76 shown in FIG. 4) for interpolating a phase of the information signal read from the recording medium on the basis of a phase error signal sent as a feedback; waveform equalizing means (e.g., the phase-fixed adaptive waveform equalizer 80 shown in FIG. 4) for equalizing a waveform of the information signal whose phase has been interpolated by the phase interpolating means while keeping the phase of the information signal fixed; and phase-error-signal generating means (e.g., the ITR-PLL circuit 81 shown in FIG. 4) for generating the phase error signal to be sent as a feedback to the phase interpolating means on the basis of the information signal whose waveform has been equalized by the waveform equalizing means.

A signal processing method and program according to the second embodiment of the present invention is a signal processing method and program for a signal processing apparatus for processing an information signal read from a recording medium, including the steps of interpolating a phase of the information signal read from the recording medium on the basis of a phase error signal sent as a feedback (e.g., step S2 shown in FIG. 8); equalizing a waveform of the phase-interpolated information signal while keeping the phase of the information signal fixed (e.g., step S4 shown in FIG. 8); and generating the phase error signal to be sent as a feedback for the phase interpolation on the basis of the information signal whose waveform has been equalized (e.g., step S4 shown in FIG. 8).

A specific embodiment of the present invention will now herein be described in detail below with reference to the drawings.

FIG. 4 illustrates an exemplary structure of a reproducing apparatus according to an embodiment of the present invention. A reproducing apparatus 70 shown in FIG. 4 reproduces channel data from a higher density recording medium 71, such as a Blu-ray disc (registered trademark). The reproducing apparatus 70 includes a media drive 72, a frequency synthesizer 73, an analog filter 74, an A/D converter 75, a phase interpolator 76, an adaptive waveform equalizer 77, a Viterbi decoder 78, an LMS circuit 79, a phase-fixed adaptive waveform equalizer 80, and an ITR-PLL circuit 81.

The media drive 72 reads a signal recorded on the recording medium 71 and outputs the signal as a reproduced-information signal to the analog filter 74. The frequency synthesizer 73 generates a predetermined fixed clock on the basis of a reference clock. The fixed clock generated is supplied to components of the reproducing apparatus 70.

The analog filter 74 equalizes the waveform of the reproduced-information signal input from the media drive 72 and outputs the waveform-equalized signal to the A/D converter 75. The A/D converter 75 samples (digitizes) the waveform-equalized analog signal in synchronization with the fixed clock and outputs the sampled (digitized) signal to the phase interpolator 76.

The phase interpolator 76 interpolates the phase of the digitized signal on the basis of a phase error signal sent as a feedback from the ITR-PLL circuit 81 and outputs the phase-interpolated signal to the adaptive waveform equalizer 77 and the phase-fixed adaptive waveform equalizer 80.

The adaptive waveform equalizer 77 includes an FIR filter. On the basis of feedback information input from the LMS circuit 79, the adaptive waveform equalizer 77 changes tap coefficients of the FIR filter, equalizes the waveform of the phase-interpolated signal input from the phase interpolator 76, and outputs the waveform-equalized signal to the Viterbi decoder 78 and the LMS circuit 79. No particular limitation is imposed on phase change involved in the waveform equalization performed by the adaptive waveform equalizer 77.

The Viterbi decoder 78 decodes the waveform-equalized signal generated by the adaptive waveform equalizer 77, outputs the decoded result serving as channel data to a subsequent stage, and sends the channel data as a feedback to the LMS circuit 79 and the ITR-PLL circuit 81.

Since the waveform of the signal input to the Viterbi decoder 78 is appropriately equalized without any limitation on the phase change, as has been described above, the decoding performance of the Viterbi decoder 78 is not degraded.

The phase-fixed adaptive waveform equalizer 80 includes an FIR filter. The phase-fixed adaptive waveform equalizer 80 equalizes the waveform of the phase-interpolated signal input from the phase interpolator 76 and outputs the waveform-equalized signal to the ITR-PLL circuit 81. Regarding the waveform equalization performed by the phase-fixed adaptive waveform equalizer 80, no phase change is allowed.

The ITR-PLL circuit 81 generates a phase error signal corresponding to a phase difference between the waveform-equalized signal generated by the phase-fixed adaptive waveform equalizer 80 in which no phase change is involved and the channel data generated as a result of Viterbi decoding and sends the phase error signal as a feedback to the phase interpolator 76.

Since the waveform-equalized signal input to the ITR-PLL circuit 81 involves no phase change, interference between the phase interpolation processing performed by the phase interpolator 76 to which the phase error signal is sent as a feedback and the waveform equalization processing performed by the adaptive waveform equalizer 77 is suppressed.

Next, an exemplary structure of the adaptive waveform equalizer 77 and an exemplary structure of the phase-fixed adaptive waveform equalizer 80 will be described.

As has been described above, the adaptive waveform equalizer 77 and the phase-fixed adaptive waveform equalizer 80 each include an FIR filter. In general, if an FIR filter has tap coefficients that are symmetrical about a central tap, there will be no phase change in frequency components of a signal before and after waveform equalization. In contrast, if the tap coefficients are symmetrical about the central tap, the frequency components of the signal prior to waveform equalization are generally not in phase with the frequency components of the waveform-equalized signal, resulting in phase changes in the frequency components of the signal before and after waveform equalization.

Therefore, the adaptive waveform equalizer 77 in which no limitation is imposed on phase change involved in waveform equalization has tap coefficients of the FIR filter which are not symmetrical about the central tap. In contrast, the phase-fixed adaptive waveform equalizer 80 in which phase change involved in waveform equalization is prohibited has tap coefficients of the FIR filter which are symmetrical about the central tap.

Figure 5:
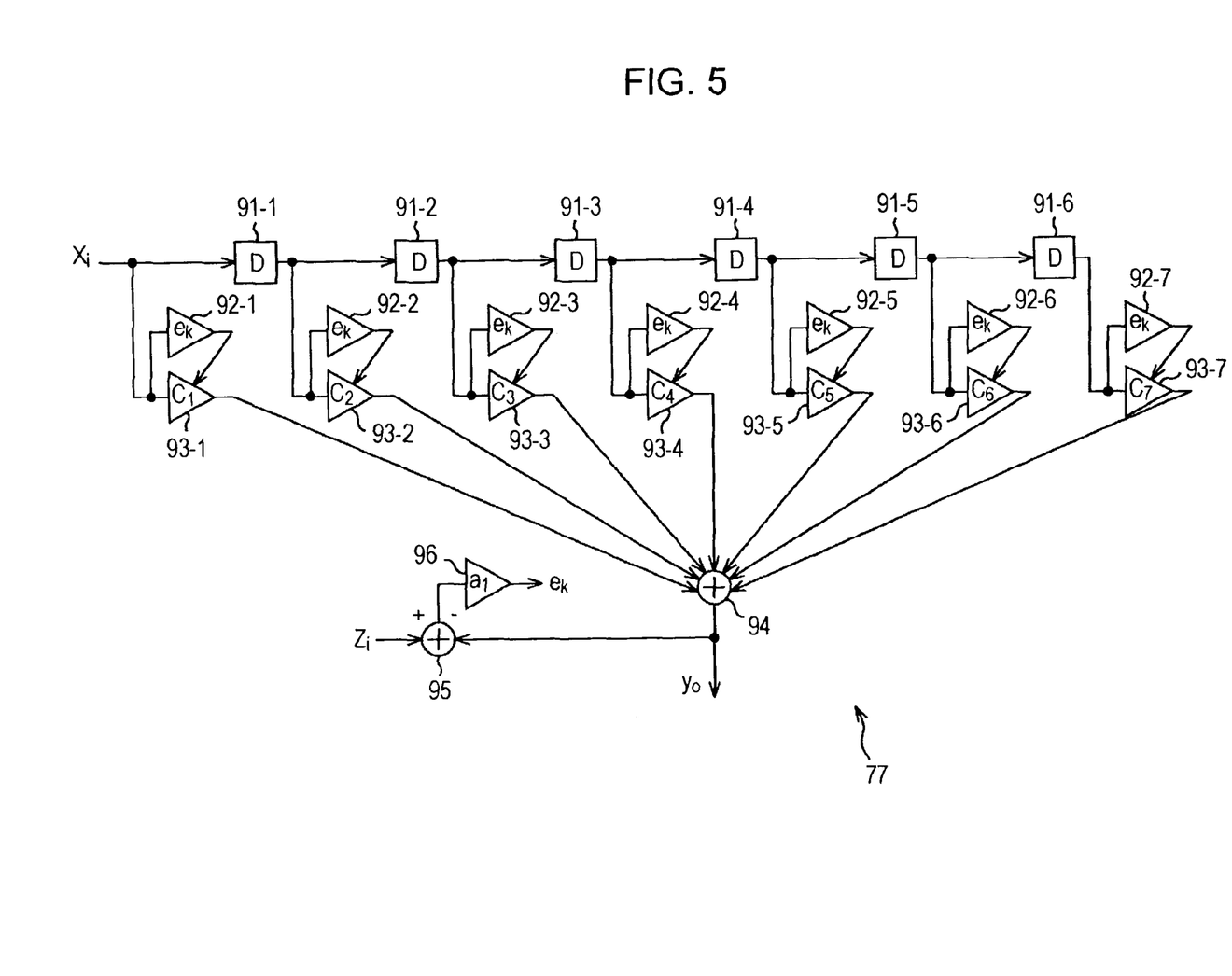
FIG. 5 is a block diagram of an exemplary structure of an adaptive waveform equalizer.

FIG. 5 illustrates an exemplary structure of the adaptive waveform equalizer 77 including a 7-tap FIR filter. The adaptive waveform equalizer 77 includes delay elements (D) 91-1 to 91-6 for delaying an input signal by one clock and outputting the delayed signal to a subsequent stage; multipliers 92-1 to 92-7 for multiplying an input signal by a coefficient $e_k$; multipliers 93-1 to 93-7 for multiplying an input signal by corresponding tap coefficients $C_1$, $C_2$, $C_3$, $C_4$, $C_5$, $C_6$, and $C_7$; an adder 94 for adding the multiplication results obtained by the multipliers 93-1 to 93-7; a subtracter 95 for calculating a difference between a filter output $y_o$ which is an output of the adder 94 and a target signal $Z_i$; and a multiplier 96 for obtaining the coefficient $e_k$ by multiplying an output of the subtracter 95 by an updating gain $a_1$.

It is not necessary for the tap coefficients $C_1$ to $C_7$ of the multipliers 93-1 to 93-7 to be symmetrical about the central tap, and the tap coefficients $C_1$ to $C_7$ are determined by the LMS algorithm so that the squared error between the filter output $y_o$ and the target signal $Z_i$ becomes minimum. The updating gain $a_1$ is a positive-value parameter for determining the convergence speed of adaptation operation. The larger the updating gain $a_1$, the faster the adaptation operation, and the tap coefficients converge at higher speed, though the operation becomes unstable due to disturbance. Therefore, the updating gain $a_1$ is set in advance to an appropriate value in accordance with the adaptation speed and stability.

Figure 6:
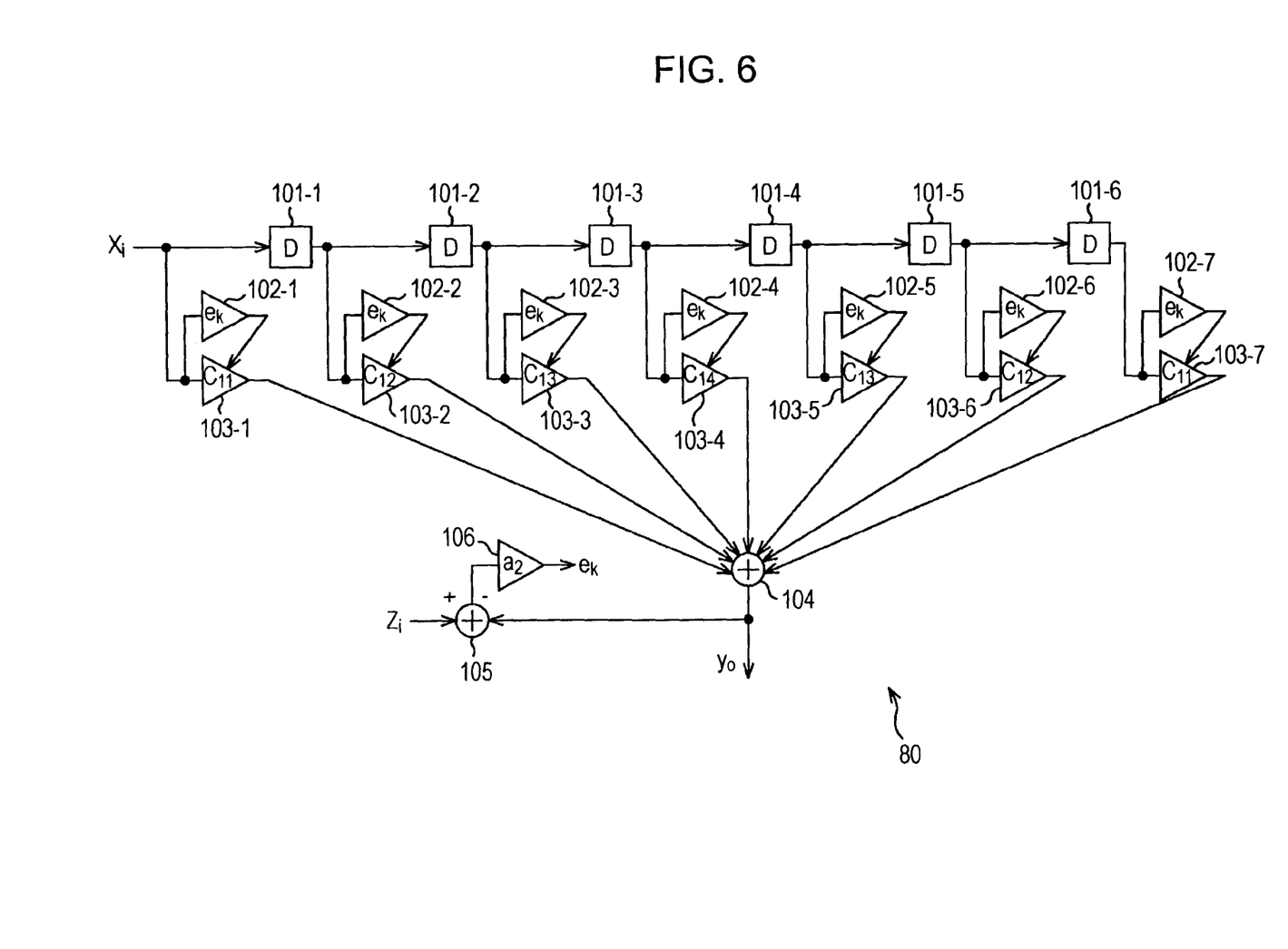
FIG. 6 is a block diagram of a first exemplary structure of a phase-fixed adaptive waveform equalizer.

FIG. 6 illustrates a first exemplary structure of the phase-fixed adaptive waveform equalizer 80 including a 7-tap FIR filter. The first exemplary structure of the phase-fixed adaptive waveform equalizer 80 includes delay elements (D) 101-1 to 101-6 for delaying an input signal by one clock and outputting the delayed signal to a subsequent stage; multipliers 102-1 to 102-7 for multiplying an input signal by a coefficient $e_k$; multipliers 103-1 to 103-7 for multiplying an input signal by corresponding tap coefficients $C_{11}$, $C_{12}$, $C_{13}$, $C_{14}$, $C_{13}$, $C_{12}$, and $C_{11}$; an adder 104 for adding the multiplication results obtained by the multipliers 103-1 to 103-7; a subtracter 105 for calculating a difference between a filter output $y_o$ which is an output of the adder 104 and a target signal $Z_i$; and a multiplier 106 for obtaining the coefficient $e_k$ by multiplying an output of the subtracter 105 by an updating gain $a_2$.

The corresponding tap coefficients $C_{11}$, $C_{12}$, $C_{13}$, $C_{14}$, $C_{13}$, $C_{12}$, and $C_{11}$ of the multipliers 103-1 to 103-7 are symmetrical about the central tap and are determined by the LMS algorithm so that the squared error between the filter output $y_o$ and the target signal $Z_i$ becomes minimum. The updating gain $a_2$ is a positive-value parameter for determining the convergence speed of adaptation operation. The larger the updating gain $a_2$, the faster the adaptation operation, and the tap coefficients converge at higher speed, though the operation becomes unstable due to disturbance. Therefore, the updating gain $a_2$ is set in advance to an appropriate value in accordance with the adaptation speed and stability.

Figure 7:
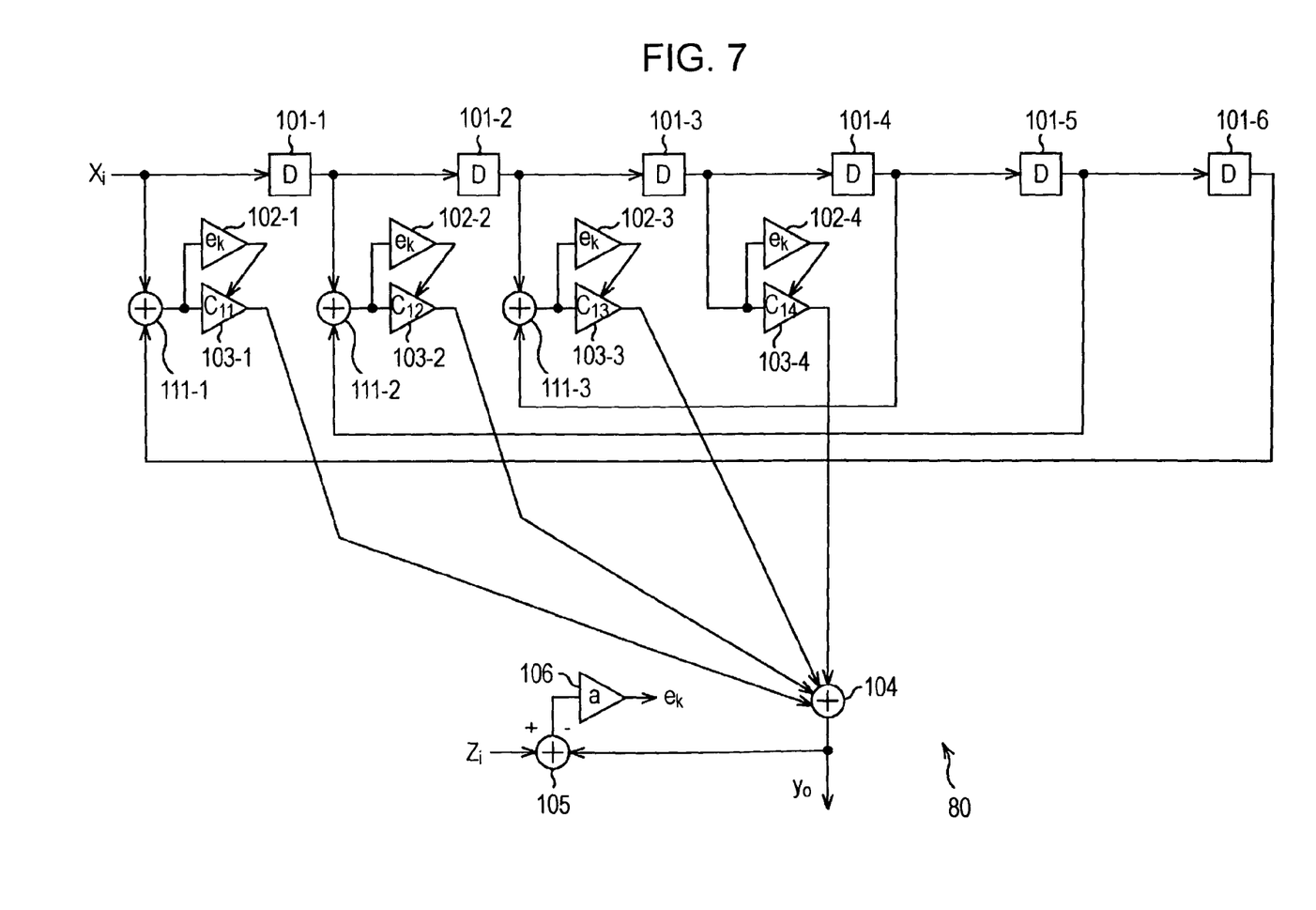
FIG. 7 is a block diagram of a second exemplary structure of a phase-fixed adaptive waveform equalizer.

FIG. 7 illustrates a second exemplary structure of the phase-fixed adaptive waveform equalizer 80 including a 7-tap FIR filter. The second exemplary structure is a simplified version of the first exemplary structure using the point that the tap coefficients are symmetrical about the central tap.

That is, the second exemplary structure of the phase-fixed adaptive waveform equalizer 80 is such that six multipliers including the multipliers 102-5 to 102-7 and the multipliers 103-5 to 103-7 are deleted from the first exemplary structure, and three adders 111-1 to 111-3 are added to the first exemplary structure. Since the same reference numerals are given to components common to the first exemplary structure, repeated descriptions thereof are omitted.

Next, a reproducing process of reproducing channel data from the recording medium 71 using the reproducing apparatus 70 will now be described with reference to a flowchart shown in FIG. 8.

The reproducing process starts when, while the recording medium 71 is inserted into the media drive 72, for example, a user gives an instruction to reproduce data. It is assumed that a fixed clock generated by the frequency synthesizer 73 is supplied to the components of the reproducing apparatus 70.

In step S1, the media drive 72 outputs a reproduced-information signal read from the recording medium 71 to the analog filter 74. The analog filter 74 equalizes the waveform of the reproduced-information signal input from the media drive 72 and outputs the waveform-equalized signal to the A/D converter 75. The A/D converter 75 samples (digitizes) the waveform-equalized analog reproduced-information signal in synchronization with the fixed clock and outputs the sampled (digitized) signal to the phase interpolator 76.

In step S2, the phase interpolator 76 interpolates the phase of the waveform-equalized, digitized reproduced-information signal on the basis of a phase error signal sent as a feedback from the ITR-PLL circuit 81 and outputs the phase-interpolated signal to the adaptive waveform equalizer 77 and the phase-fixed adaptive waveform equalizer 80.

In step S3, the adaptive waveform equalizer 77 equalizes the waveform of the phase-interpolated signal input form the phase interpolator 76 and outputs the waveform-equalized signal to the Viterbi decoder 78 and the LMS circuit 79. The tap coefficients in the adaptive waveform equalizer 77 are updated as necessary on the basis of feedback information input from the LMS circuit 79. The Viterbi decoder 78 decodes the waveform-equalized signal generated by the adaptive waveform equalizer 77, outputs the decoded result serving as channel data to a subsequent stage, and sends the channel data as a feedback to the LMS circuit 79 and the ITR-PLL circuit 81.

In contrast, in step S4, the phase-fixed adaptive waveform equalizer 80 equalizes the waveform of the phase-interpolated signal input from the phase interpolator 76 and outputs the waveform-equalized signal to the ITR-PLL circuit 81. The ITR-PLL circuit 81 generates a phase error signal corresponding to a phase difference between the waveform-equalized signal, which is input from the phase-fixed adaptive waveform equalizer 80 and which involves no phase change, and the channel data generated as a result of Viterbi decoding and sends the phase error signal as a feedback to the phase interpolator 76.

For convenience of description, the processing in step S3 and the processing in step S4 are described in order; actually, however, the processing in step S3 and the processing in step S4 are performed in parallel continuously. Hereinabove, the reproducing process performed by the reproducing apparatus 70 has been described.

According to the reproducing process described above, the adaptive waveform equalizer 77 for supplying the waveform-equalized signal to the Viterbi decoder 78 and the phase-fixed adaptive waveform equalizer 80 for sending the waveform-equalized signal involving no phase change as a feedback to the ITR-PLL circuit 81 are provided separately. As a result, the operation of the ITR-PLL circuit 81 becomes stable. Since the tap coefficients in the adaptive waveform equalizer 77 converge and become optimal values using the LMS algorithm, the degradation of the decoding performance of the Viterbi decoder 78 can be suppressed.

The series of processes described above can be performed using hardware or software. If software is employed to perform this series of processes, a program constituting the software is installed from a recording medium onto a computer included in dedicated hardware or, for example, a general-purpose personal computer capable of performing various functions using various programs installed thereon.

In this specification, steps executed on the basis of the program may include processes that are executed sequentially in the order described, as well as processes that are not necessarily executed sequentially but exacted in parallel or individually.

It should be understood by those skilled in the art that various modifications, combinations, sub-combinations and alterations may occur depending on design requirements and other factors insofar as they are within the scope of the appended claims or the equivalents thereof.

What is claimed is:

1. A reproducing apparatus for reproducing channel data from a recording medium using interpolated timing recovery, comprising: a
reading means for reading an information signal recorded on the recording medium;
phase interpolating means for interpolating a phase of the information signal read by the reading means on the basis of a phase error signal sent as a feedback;
first waveform equalizing means for equalizing a waveform of the information signal whose phase has been interpolated by the phase interpolating means while keeping the phase of the information signal fixed;
phase-error-signal generating means for generating the phase error signal to be sent as a feedback to the phase interpolating means on the basis of the information signal whose waveform has been equalized by the first waveform equalizing means;
second waveform equalizing means for equalizing the waveform of the information signal whose phase has been interpolated by the phase interpolating means without limiting a change of the phase; and
decoding means for generating the channel data by decoding the information signal whose waveform has been equalized by the second waveform equalizing means.

2. The reproducing apparatus according to claim 1, wherein the phase-error-signal generating means generates the phase error signal to be sent as a feedback to the phase interpolating means on the basis of a phase error between the information signal whose waveform has been equalized by the first waveform equalizing means and the channel data generated by the decoding means.

3. The reproducing apparatus according to claim 1, wherein the first waveform equalizing means includes a finite impulse response filter including a plurality of taps, and tap coefficients of the plurality of taps are symmetrical about a central one of the plurality of taps.

4. The reproducing apparatus according to claim 1, wherein the second waveform equalizing means includes a finite impulse response filter including a plurality of taps, and tap coefficients of the plurality of taps are determined on the basis of a least mean square algorithm.

5. A reproducing method for a reproducing apparatus for reproducing channel data from a recording medium using interpolated timing recovery, comprising the steps of:
reading an information signal recorded on the recording medium;
interpolating a phase of the information signal read on the basis of a phase error signal sent as a feedback;
equalizing a waveform of the phase-interpolated information signal while keeping the phase of the information signal fixed;
generating the phase error signal to be sent as a feedback for the phase interpolation on the basis of the information signal whose waveform has been equalized while keeping the phase fixed;
equalizing the waveform of the phase-interpolated information signal without limiting a change of the phase; and
generating the channel data by decoding the information signal whose waveform has been equalized without limiting a change of the phase.

6. A non-transitory computer readable medium encoded with a control program for a reproducing apparatus for reproducing channel data from a recording medium using interpolated timing recovery, the program causing a computer included in the reproducing apparatus to perform a process comprising the steps of:
reading an information signal recorded on the recording medium;
interpolating a phase of the information signal read on the basis of a phase error signal sent as a feedback;
equalizing a waveform of the phase-interpolated information signal while keeping the phase of the information signal fixed;
generating the phase error signal to be sent as a feedback for the phase interpolation on the basis of the information signal whose waveform has been equalized while keeping the phase fixed;
equalizing the waveform of the phase-interpolated information signal without limiting a change of the phase; and
generating the channel data by decoding the information signal whose waveform has been equalized without limiting a change of the phase.

7. A reproducing apparatus for reproducing channel data from a recording medium using interpolated timing recovery, comprising:
a reading unit configured to read an information signal recorded on the recording medium;
a phase interpolator configured to interpolate a phase of the information signal read by the reading means on the basis of a phase error signal sent as a feedback;
a first waveform equalizer configured to equalize a waveform of the information signal whose phase has been interpolated by the phase interpolator while keeping the phase of the information signal fixed;
a phase-error-signal generator configured to generate the phase error signal to be sent as a feedback to the phase interpolator on the basis of the information signal whose waveform has been equalized by the first waveform equalizer;
a second waveform equalizer configured to equalize the waveform of the information signal whose phase has been interpolated by the phase interpolator without limiting a change of the phase; and
a decoder configured to generate the channel data by decoding the information signal whose waveform has been equalized by the second waveform equalizer.

* * * * *